United States Patent [19]

Millard

[11] Patent Number: 5,230,419

[45] Date of Patent: Jul. 27, 1993

[54] REMOTELY POSITIONABLE MATERIAL EXTRACTION DEVICE

[75] Inventor: Julian W. F. Millard, Toronto, Canada

[73] Assignee: Spar Aerospace Limited, Brampton, Canada

[21] Appl. No.: 857,227

[22] Filed: Mar. 25, 1992

[51] Int. Cl.⁵ ............................................. B65G 33/32
[52] U.S. Cl. ..................................... 198/668; 198/518; 414/141.9
[58] Field of Search ............... 198/668, 666, 518, 519; 414/306, 310, 311, 326, 140.7, 141.9

[56] References Cited

U.S. PATENT DOCUMENTS

| | | | |
|---|---|---|---|
| 1,933,404 | 10/1933 | Allen et al. | 198/303 |
| 2,050,984 | 8/1936 | Surdy | 198/659 |
| 2,127,922 | 8/1938 | Ketchpel | 198/668 |
| 2,127,923 | 8/1938 | MacKenzie | 198/668 |
| 2,150,163 | 3/1939 | Hanna | 198/668 X |
| 2,205,596 | 6/1940 | Lower | 198/668 X |
| 2,266,650 | 12/1941 | Matheis | 198/668 |
| 2,380,840 | 7/1945 | Hanna | 198/668 X |
| 2,413,448 | 12/1946 | Hanna | 198/668 X |
| 2,718,970 | 9/1955 | Dueringer | 198/518 X |
| 2,763,362 | 9/1956 | Greaves | 414/310 X |
| 2,830,695 | 4/1958 | Fennimore et al. | 198/659 |
| 3,252,562 | 5/1966 | Brembeck | 198/550.1 |
| 4,334,818 | 6/1982 | Tingskog | 414/141.9 X |
| 4,989,716 | 2/1991 | Stuckey | 198/311 |
| 4,992,017 | 2/1991 | Carro | 414/140.7 X |

FOREIGN PATENT DOCUMENTS

| | | | |
|---|---|---|---|
| 1062056 | 7/1959 | Fed. Rep. of Germany | 198/668 |
| 1297945 | 11/1972 | United Kingdom | 198/668 |
| 2185957 | 8/1987 | United Kingdom | 198/518 |

Primary Examiner—Robert P. Olszewski
Assistant Examiner—James R. Bidwell

[57] ABSTRACT

A device to remotely extract particulate material comprises a number of archimedes screw sections joined end-to-end by universal joints and surrounded by a housing which articulates at the universal joints. The screw sections terminate in a material extraction head at the ingress end of the housing. A housing support runs the length of the housing and includes push arms which extend to the housing proximate the ingress end of the housing. The push arms may be remotely extended in order to translate the material extraction head. Furthermore, the housing support may be rotated about its longitudinal axis to move the material extraction head. In this way material over an area may be extracted.

11 Claims, 3 Drawing Sheets

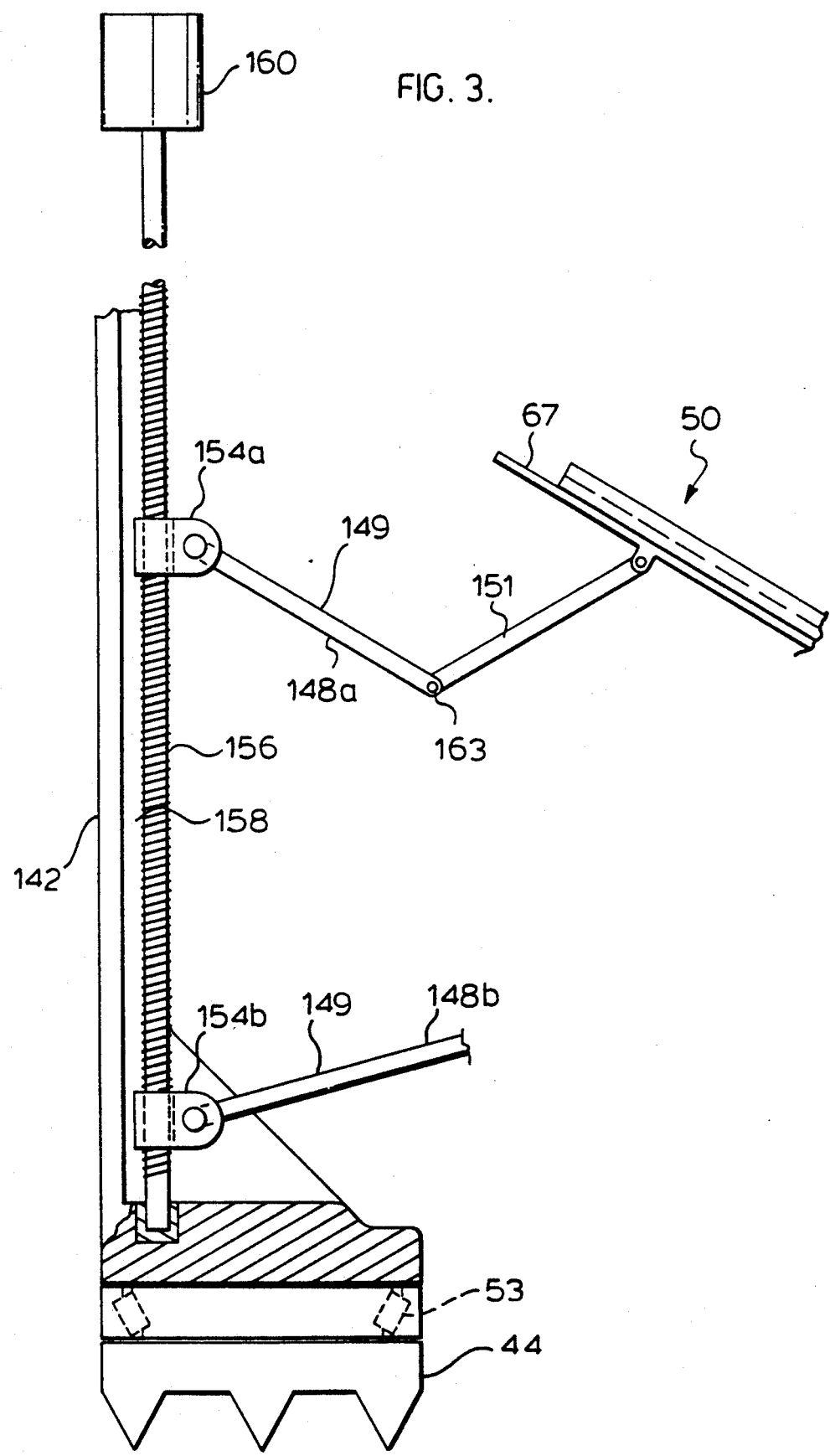

REMOTELY POSITIONABLE MATERIAL EXTRACTION DEVICE

BACKGROUND OF THE INVENTION

1. Field of the Invention

This invention relates to a material extraction device.

2. Description of the Related Art

Hazardous wastes may be temporarily stored in silos. Where such wastes are dry particulates, one known method of extraction is to pump water into the top of the silo and lower a centrifugal pump into the resulting slurry in order to raise the slurry. For certain particulate wastes, however, this approach is unacceptable since it is important that the wastes be kept dry. This is so with radioactive wastes because the addition of water would mobilise active isotopes and/or toxins greatly increasing the risk of their spread, including into the local water table.

The subject invention seeks to provide a material extraction device which may be used to extract dry particulate materials without any addition to or change of the state of that waste.

SUMMARY OF THE INVENTION

According to the present invention, there is provided a material extraction device, comprising: at least two serial archimedes screw sections joined by a universal joint; a housing for said archimedes screw sections, said housing having means to flex at each said universal joint, said housing having an ingress end and an egress end; material extraction means at said ingress end of said housing; a housing support running along substantially the length of said housing nd terminating in a foot toward the ingress end of said housing for retaining said housing support in a position; remotely controlled moveable means extending between said housing support and said housing for acting between said housing support and said housing in order to translate said material extraction means toward and away from said housing support, whereby said material extraction means may be selectively translated by said moveable means so as to extract material over an area. Preferably, the device includes means to rotate a portion of the housing support, including the remotely controlled moveable means, about an axis such that rotation of the portion of the housing sweeps said material extraction means through an arc.

BRIEF DESCRIPTION OF THE DRAWINGS

In the figures which disclose example embodiments of the invention,

FIG. 3 is a cross-sectional view of a portion of a material extraction device made in accordance with another embodiment of the invention.

DESCRIPTION OF THE PREFERRED EMBODIMENTS

Figure 1:
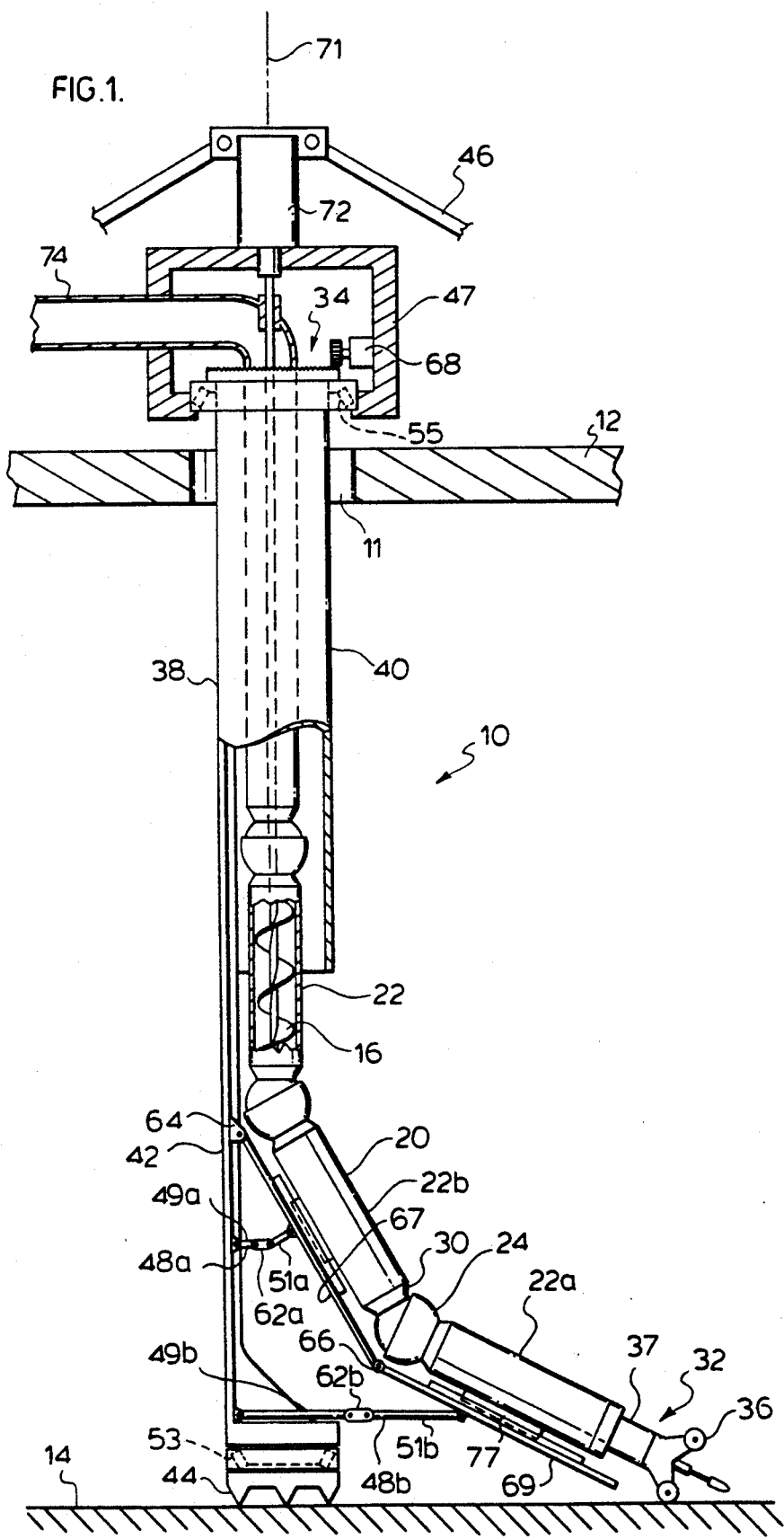
FIG. 1 is a side view of a material extraction device made in accordance with this invention.
Figure 2:
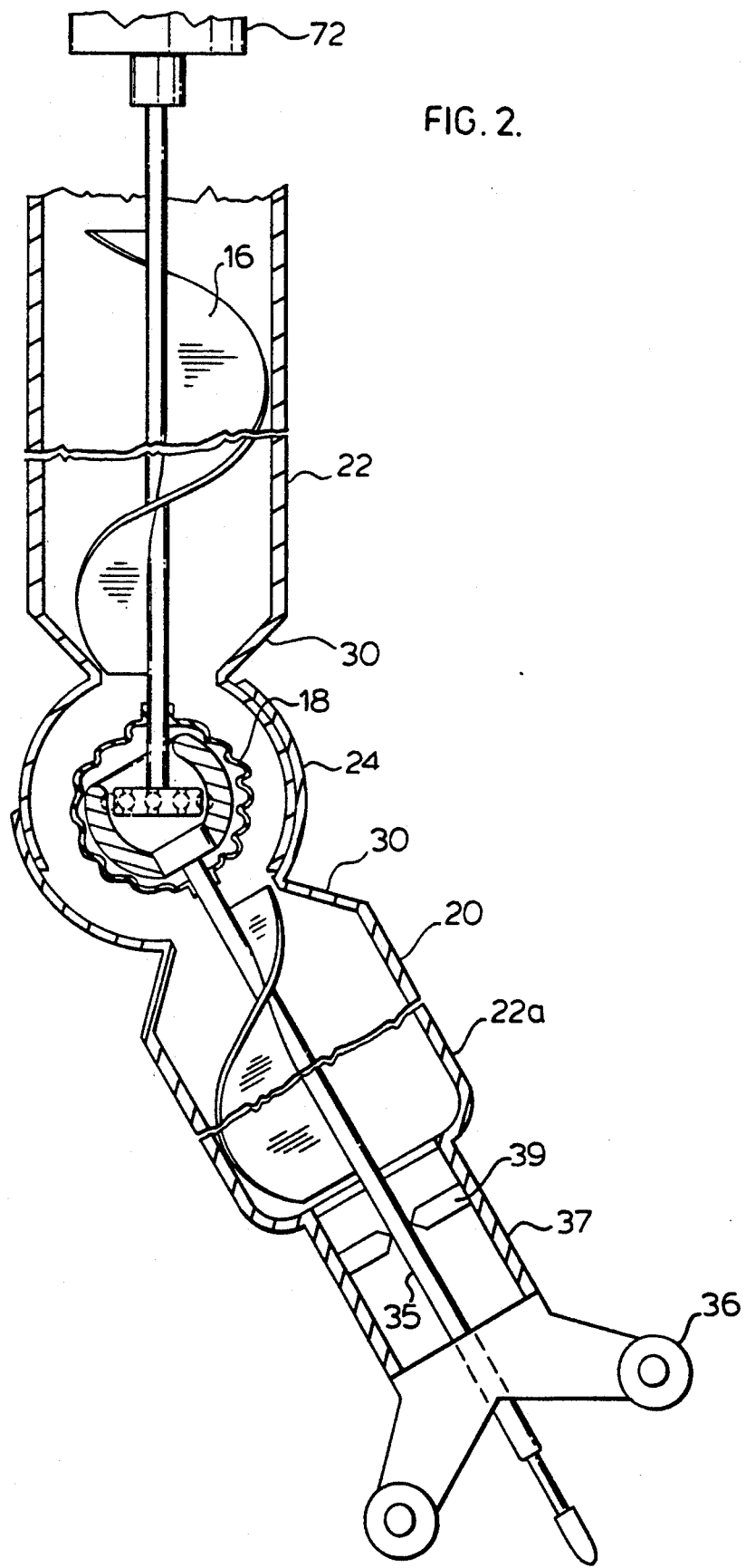
FIG. 2 is a side view of a portion of the device of FIG. 1.

With reference to FIG. 1, a material extraction device 10 is shown extending through access hole 11 of a silo 12 containing particulate matter 14. The material extraction device comprises a number of archimedes screw sections 16 joined end-to-end by universal joints 18, as seen in FIG. 2. A housing 20 for the archimedes screw sections comprises cylindrical housing sections 22 which are joined end-to-end by constant volume flexible joints comprising constant volume spherical couplings 24. As seen in FIG. 2, the spherical couplings are located over the universal joints 18 of the screw sections Each universal joint 18 comprises a caged ball race within a barrel spline. Flexible end segments 30 of the cylindrical sections 22 allow further flexing of the housing sections with respect to each other.

Returning to FIG. 1, the egress end 34 of the housing is connected via a rotatable coupling (not shown) to discharge chute 74. The ingress end 32 of the housing 20 terminates in a thrust bearing housing 37 and a material extraction head comprising drill cutter 36 which extends from the thrust bearing housing. As seen in FIG. 2, the archimedes screw section proximate the ingress end 32 of housing 20 terminates in a shaft extension 35 which extends through the thrust bearing housing 37 to the drill cutter 36. A taper roller thrust bearing 39 supports the shaft extension 35 within the thrust bearing housing 37.

A housing support 38 comprises a casing 40, leg 42, foot 44, tripod 46 with tripod block 47, articulated tray 50 and push arms 48. The casing 40 with leg 42 is rotatably supported between the rotary bearing 55 of tripod block 47 and the rotary bearing 53 of foot 44; the foot rests on the silo floor or on material 14 within the silo. Consequently, the foot and tripod retain the housing support in position within the silo. A drive 68 is supported in tripod block 47 and is geared to the casing 40 so that the drive can rotate the casing about axis 71.

The articulated tray 50 comprises tray segment 67 mounted at pivot 64 to leg 42 of the housing support 38 and tray segment 69 attached to the free end of tray segment 67 by pivot 66. The cylindrical housing section 22a which is at ingress end 32 of housing 20 is slidably attached to the tray segment 69 by tongue 77 extending from the cylindrical section into a groove running along the tray segment 69. A similar tongue and groove arrangement slidably joins cylindrical section 22b to tray segment 67.

The housing support 38 also includes movable push arms 48a, 48b which extend between leg 42 and articulated tray 50. Each push arm comprises upper arm 49a, 49b pivotably mounted to leg 42 and lower arm 51a, 51b pivotably mounted to tray 50, with one of the push arms 48a being mounted to tray segment 67 and the other 48b to tray segment 69. A remote, controlled drive 62a, 62b pivotably connects the upper arm 49a, 49b and lower arm 51 of each arm 48a, 48b.

A variable speed motor 72 is provided to circulate the end-to-end joined archimedes screws sections 16.

In operation, when motor 72 is activated, the archimedes screw sections, along with the drill cutter 36 which is joined to the last archimedes screw section via shaft extension 35, are rotated. This results in the drill cutters breaking up and drawing in any particulate matter present at the cutters. The broken-up particulate matter is pushed through the thrust bearing housing 37 to the archimedes screw sections which draw the particulate matter up through housing 20 to the egress end 34 of the housing. Discharge chute 74 may contain a screw conveyor to move the raised particulate matter through the discharge chute. Drives 62a, 62b may then be remotely activated to extend the push arms 48a, 48b which push against articulated tray 50 to cause the drill cutter 36 to move away from leg 42 as it breaks up material. Once the push arms have been fully extended, they may be retracted again and drive 68 activated in order to rotate the housing support 38 and therefore housing 20—which is constrained to rotate with the housing support due to the tongue and groove attachment between the tray segments 67, 69 and the adjacent housing segments 22b, 22a—about axis 71. In this way, the drill cutter 36 is rotated about axis 71 so that the drill cutter may be moved over a circular area around the foot 44 of the material extraction device.

FIG. 3 discloses an alternate arrangement for the translation of the drill cutter 36. With reference to FIG. 3, wherein like parts have been given like reference numerals, the upper arm 149 of each push arm 148a, 148b is pivotally mounted to a block 154a. Block 154b of each arm is carried by screw shaft 156 within channel 158 of leg 142. A motor 160 is connected to one end of screw shaft 156. Each push arm also comprises an elbow 163. The upper arm 151 of each arm is pivotably connected to articulated tray 50. It will be obvious to those skilled in the art, that arm 148b must extend at a greater rate than arm 148a, accordingly, the lower section of screw 156 which receives block 154b should have a greater pitch than the upper section of the screw which receives block 154a.

In the operation of the embodiment of FIG. 3, motor 160 may be activated in order to turn screw shaft 156 so that the mounting blocks 154 of the push arms 148 move downwardly in order to extend the push arms and push out the tray, and hence the drill cutter.

Where the particulate material to be extracted is already loose, drill cutter 36 may not be necessary. In such case, the archimedes screw section proximate the ingress end 32 of housing 20 (being suitably supported by bearings within thrust bearing housing 37) could extend through the egress end and pick up loose particulate material as the ingress end is moved about. The constant volume spherical couplings of housing 20 could be replaced with any other constant volume coupling such as a constant volume barrel coupling. Flexible end segments 30 of housing 20 are not necessary to the functioning of the material extraction device 10, however, for some types of constant volume couplings between housing segments, their use is preferred.

It will be apparent to those skilled in the art that the material extraction device of this invention has application for extracting a number of materials and is especially useful where access to a material is restricted or where it is inadvisable to allow more than a small sealed access hole through to a material storage area (for example due to the risk of radionuclide or toxin release).

Other modifications will be apparent to those skilled in the art and, accordingly, the invention is defined in the claims.

What is claimed is:

1. A material extraction device, comprising:
   at least two serial archimedes screw sections joined by a universal joint;
   a housing for said archimedes screw sections, said housing having means to flex at each said universal joint, said housing having an ingress end and an egress end;
   material extraction means at said ingress end of said housing;
   a housing support running along substantially the length of said housing and terminating in a foot toward the ingress end of said housing for retaining said housing support in a position;
   remotely controlled moveable means extending between said housing support and said housing for acting between said housing support and said housing in order to translate said material extraction means toward and away from said housing support, whereby said material extraction means may be selectively translated by said moveable means so as to extract material over an area.

2. The device of claim 1 including means to rotate a portion of said housing support at said remotely controlled moveable means about an axis such that rotation of said portion of said housing sweeps said material extraction means through an arc.

3. The device of claim 2 wherein said moveable means comprises at least one push arm and including means to extend said at least one push arm a selectable amount.

4. The device of claim 3 wherein said housing support is substantially rigid about said axis.

5. The device of claim 4 wherein said archimedes screw sections are joined end-to-end.

6. The device of claim 5 wherein said at least one push arm is articulated and including remotely controlled motive means at the articulation of said at least one push arm to extend said at least one push arm.

7. The device of claim 5 wherein said at least one articulated push arm has an end associated with said housing support and motive means to move said end of said at least one push arm toward or away from said foot to thereby extend or retract said articulated arm.

8. The device of claim 3 wherein said material extraction means comprises a drill cutter head.

9. The device of claim 3 wherein said housing comprises at least two generally cylindrical housing sections, each joined to an adjacent housing section by a constant volume coupling positioned at said universal joint.

10. A material extraction device, comprising:
    a plurality of archimedes screw sections joined end-to-end by universal joints;
    a housing for said archimedes screw sections, said housing comprising generally cylindrical housing sections each joined to an adjacent housing section by a pivotable joint such that each pivotable joint is positioned in alignment with one of said universal joints, said housing having an ingress end and an egress end;
    a material extraction head at said ingress end of said housing;
    a housing support running substantially the length of said housing having a foot for retaining said support in position and moveable means including (i) a plurality of articulated push arms extending to said housing and (ii) motive means to extend each of said push arms so that said push arms may translate said material extraction means;
    whereby said material extraction means may be selectively moved by said push arms so as to extract material over an area.

11. The material extraction device of claim 10 wherein said moveable means further includes an articulated tray for supporting said housing, said push arms joined at one end to said tray.

* * * * *